United States Patent [19]

Baillie

[11] Patent Number: 4,702,488
[45] Date of Patent: Oct. 27, 1987

[54] STEERING SYSTEM FOR TRACTOR-TRAILER UNITS

[75] Inventor: Lloyd A. Baillie, Plano, Tex.

[73] Assignee: Atlantic Richfield Company, Los Angeles, Calif.

[21] Appl. No.: 863,661

[22] Filed: May 15, 1986

Related U.S. Application Data

[63] Continuation-in-part of Ser. No. 681,754, Dec. 14, 1984, abandoned.

[51] Int. Cl.⁴ .............................................. B62D 13/02
[52] U.S. Cl. .................................................... 280/426
[58] Field of Search ....................... 280/426, 442, 419

[56] References Cited

U.S. PATENT DOCUMENTS

| | | | |
|---|---|---|---|
| 3,195,922 | 7/1965 | Homes | 280/426 |
| 3,533,645 | 10/1970 | Newberry | 280/426 |
| 3,591,203 | 7/1971 | Steiner | 280/426 |
| 3,930,669 | 1/1976 | Kollander | 280/426 |
| 4,244,596 | 1/1981 | Chung | 280/426 |
| 4,570,965 | 2/1986 | Caswell | 280/426 |

Primary Examiner—John J. Love
Assistant Examiner—Donn McGiehan
Attorney, Agent, or Firm—Michael E. Martin

[57] ABSTRACT

A system for controlling turning of the trailer of a tractor-trailer unit comprising a cam which is supported on and fixed to the fifth wheel hitch member of the tractor and is engageable with cam followers mounted on a pivotable cam lever secured to the trailer frame. The cam lever includes opposed cam followers engageable with the cam and for actuating opposed traces of a flexible cable which extend along the trailer frame and are secured to a pulley mounted on a pivotable rear axle bogie of the trailer. In response to turning movements of the tractor, the trailer bogie follows a track or path through the turn which is approximately the same path as the tractor. The cam is configured so that on backing the trailer the bogie remains fixed in a non-turning position relative to the trailer frame.

17 Claims, 12 Drawing Figures

STEERING SYSTEM FOR TRACTOR-TRAILER UNITS

CROSS REFERENCE TO RELATED APPLICATION

This application is a continuation-in-part of co-pending application Ser. No. 06/681,754 filed Dec. 14, 1984, and now abandoned.

BACKGROUND OF THE INVENTION

Conventional tractor-trailer units consist of a tractor, which is connected to the semi-trailer by a hitch comprising a so-called fifth wheel member engaged with a pin connected to the trailer. The wheels of the semi-trailer unit are mounted on one or more fixed axles near the rear of the trailer. In turning a corner, the rear wheels of the trailer unit follow inside the curved path taken by the pulling tractor. This means that when a tractor drawn trailer is negotiating a sharp corner (i.e., 90 degrees), the driver must make a very wide swing with the tractor in order to insure that the trailer axles will not cut across the corner and leave the roadway.

DESCRIPTION OF PERTINENT ART

Pertinent prior art includes U.S. Pat. No. 3,533,645, to M. W. Newberry, in which a tractor and pivotable interconnected trailer are disclosed having a rear wheel assembly freely rotatable relative to the body of the trailer, a cam surface carried by the tractor, and another cam surface pivotable with the rear wheel assembly. Cam follow rods extend from one to the other of the cam surfaces and are inter-engageable therewith for limiting the degree of angular rotation of the trailer rear wheel assembly when the tractor is hauling the trailer around a curve. The trailer cam surface is responsive to means for sensing the angular displacement of the tractor from the axial alignment with the trailer for arresting the pivotable movement of the rear wheel assembly relative to the tractor after a predetermined amount of the turn is done by the tractor.

Other art includes U.S. Pat. No. 4,244,596, to T. D. Chung, which discloses a steering control apparatus for truck-trailer combinations wherein the front and rear ends of the trailer have front and rear rotatable steering transmitting plates thereon which are joined together by a crossed-cable arrangement so that the rotation of the front plate causes a corresponding rotation of the rear plate in the opposite direction. The rear plate is coupled to the rear axle assembly of the trailer to cause a corresponding horizontal angular displacement thereof. The front steering transmitting plate of the trailer is coupled to the rear coupling plate of the truck such that the front steering transmitting plate is rotated relative to the trailer whenever the truck is turned at least up to a maximum angular extent to cause corrective steering of the rear axle unit so that it will approximately trace and follow the same path as the truck when turning. Still further art of some interest includes U.S. Pat. Nos. 3,591,203 to H. Steiner and 4,570,965 to K. Caswell.

SUMMARY OF THE INVENTION

A principal object of this invention is to provide improved means for coupling a hauling tractor to a semi-trailer so that the trailer will follow very closely the curved path taken by the tractor when traversing a curve or a corner on a roadway.

Another object of this invention is to provide an apparatus for interconnecting tractors and drawn vehicles, such as a semi-trailer, which is simple in its construction, effective in operation, lends itself to economical manufacturing, and may be adapted to hitch mechanisms of conventional truck tractor units.

It is still another object of this invention to provide an apparatus capable of operating in the forward mode, as described above, while being inoperable in the reverse direction, thereby providing conventional tractor-trailer operation while backing the trailer.

An improved apparatus has been invented for controlling the turning of a truck tractor-trailer combination. In accordance with one aspect of the invention, the present apparatus comprises: wheel support means disposed near the after-end of the trailer and being rotatable relative to the trailer about a vertical axis. Cam means is removably secured to the tractor and movable relative to the trailer in response to the turning of the tractor and cooperates with means associated with the wheel support means and acting in response to the movement of the cam means to provide for limited horizontal rotation of the trailer wheel support means so that during the initial portion of a turn of the tractor, the wheels located on the trailer continue in the pre-turn direction of the travel of the trailer.

The abovenoted objects, aspects and advantages of the present invention will be further appreciated upon reading the following detailed description and claims, particularly when considered in conjunction with the accompanying drawing in which like parts bear like reference numerals.

DESCRIPTION OF A PREFERRED EMBODIMENT

Figure 1:
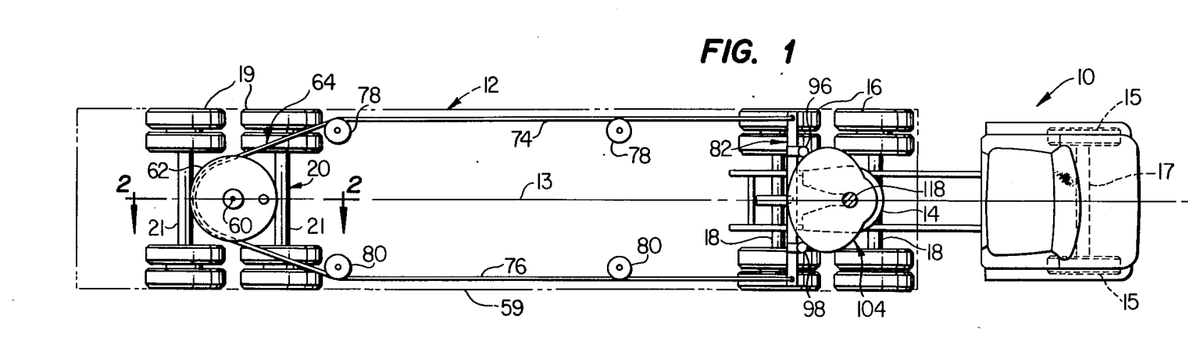
FIG. 1 is a top plan view of a tractor-trailer combination employing one embodiment of the present invention.

Referring to FIG. 1, there is shown an over-the-road truck tractor 10 and trailer 12 which include an embodiment of the present invention. The trailer 12 is coupled to a conventional tractor hitch mechanism comprising a so-called fifth wheel 14 of tractor 10, as will be discussed hereinafter. As is customary, the tractor front wheels 15 are steerable and may be mounted on separate front axle 17. The tractor rear wheel assembly 16 is also conventional and may include spaced apart, fixed, or non-steerable rear axles 18, while front wheels 15 are mounted for turning by a steering wheel, not shown, of tractor 10 in the conventional fashion. The trailer 12 includes a rear axle assembly or bogie 20 having dual wheels 19 mounted on spaced apart tandem axles 21.

Figure 2:
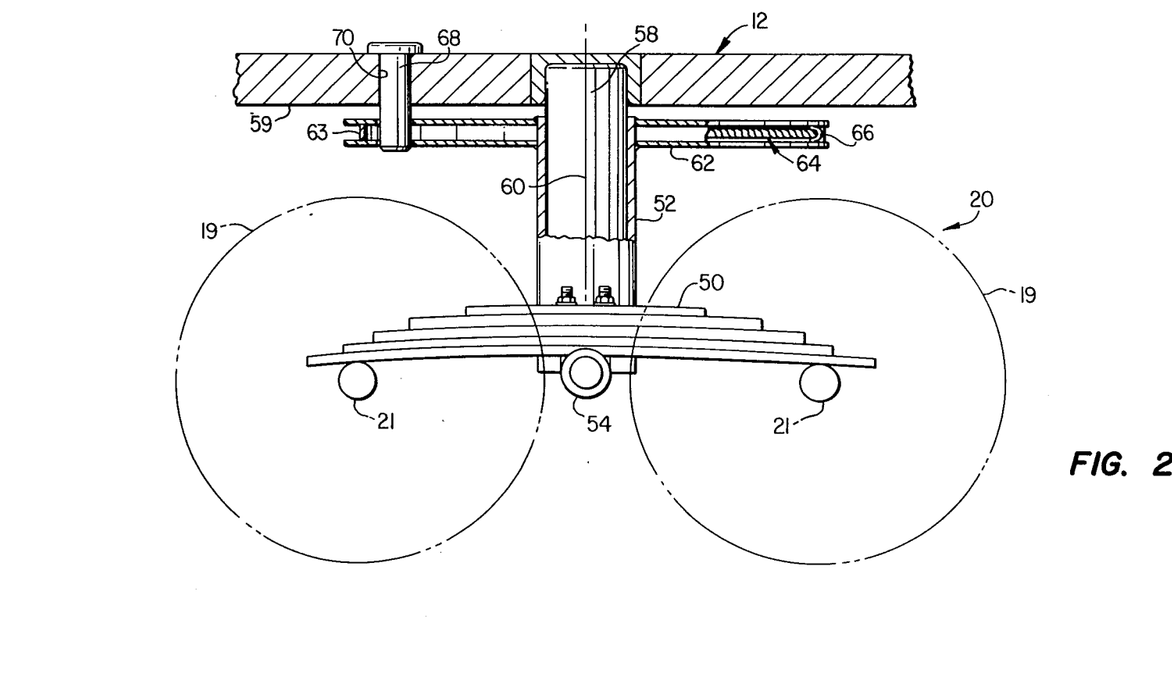
FIG. 2 is a section view taken along line 2—2 of FIG. 1.

As shown in FIG. 2, the trailer bogie 20 is situated so that two sets of leaf springs 50 (only one set is shown in FIG. 2) are suitably secured to rear axles 21 and extend on either side of a central vertically extending cylindrical tubular column member 52. The leaf springs 50 are clamped to a central transverse member 54 welded to the column member 52. A vertically depending bearing pin 58 is secured to the trailer frame 59 and extends within the column member 52 to permit pivotal movement of the bogie 20 relative to the frame 59 about an axis 60. The bearing pin 58 is rigidly secured to the trailer frame 59, and is the point of support for the rear end of the trailer 12. A pulley 36, which is welded to the upper end of column member 52, controls the orientation of the entire rear wheel assembly or bogie 20, including rear wheels 19, rear axles 21, leaf springs 50, and central transverse member 54.

A generally cylindrical pulley 62 is secured to the tubular column member 52 for rotation therewith. The pulley 62 includes a circumferential groove 63 in which a flexible wire rope or cable 64 may be trained and extended forward of the pulley 62 along both longitudinal sides of the trailer frame 59 as shown in FIG. 1, also. The cable 64 is preferably secured to the pulley 62 by suitable clamp means 66, FIG. 2, to prevent slippage of the cable 64 with respect to the pulley. The trailer bogie 20 is rotatable about the axis 60 in response to movement of the cable 64, as will be described in further detail herein. For certain operations of the trailer 12 it may be desirable to prevent pivotable movement of the trailer bogie 20 about the axis 60. In this regard, a locking pin 68, FIG. 2, is insertable through a suitable opening 70 in the trailer frame 59 and also projects through a suitable opening 72 formed in the pulley 62 when the bogie 20 is aligned for traversal of the trailer 12 in the direction of the central longitudinal axis of the truck tractor and trailer assembly. For some operations of the trailer 12 in accordance with the present invention, the pin 68 is usually removed from the position shown in FIG. 2 and stowed for use as required.

Referring further to FIG. 1, the cable 64 extends forward along opposite sides of the trailer frame 59 to form opposed traces 74 and 76 which are trained along respective idler pulleys 78 and 80. The traces 74 and 76 of the cable 64 are connected to respective opposite ends of a cam lever, generally designated by the numeral 82, which is mounted for pivotal movement on the trailer frame 59 in a manner to be described in further detail herein.

Figure 3:
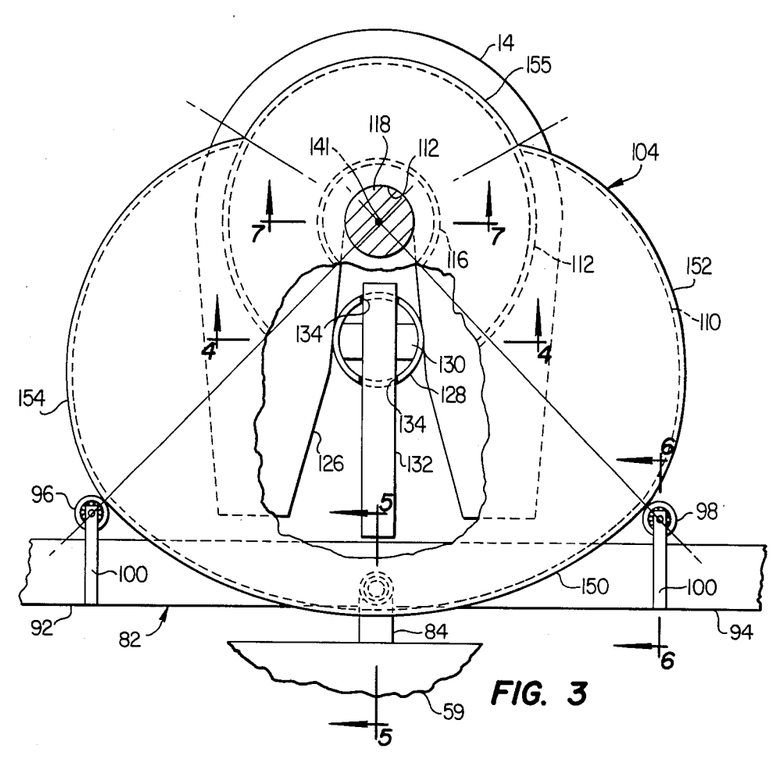
FIG. 3 is a detail plan view of the cam and its mounting arrangement.
Figure 5:
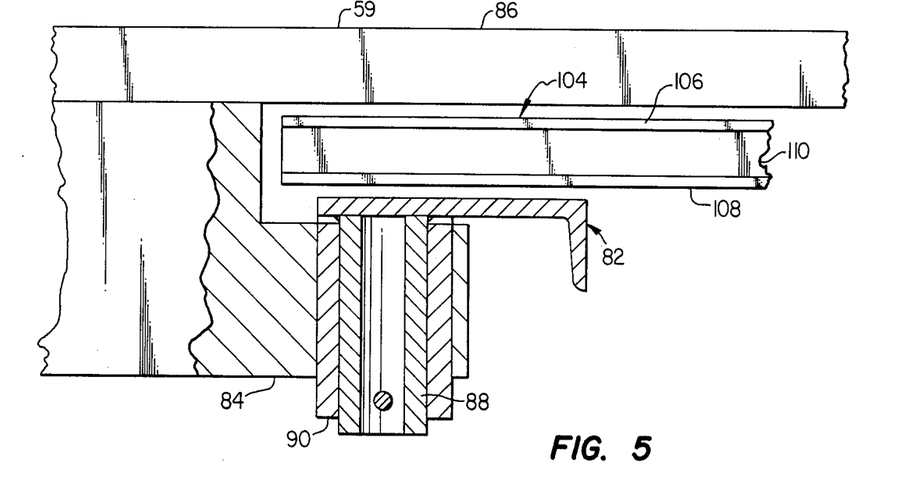
FIG. 5 is a detail section view taken along line 5—5 in FIG. 3.
Figure 6:
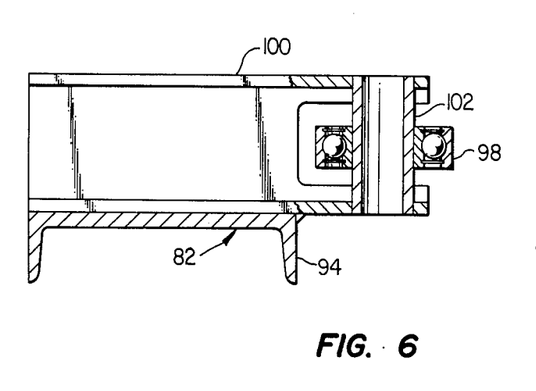
FIG. 6 is a detail section view taken along line 6—6 in FIG. 3.

Referring to FIGS. 3 and 5, the cam lever 82 is mounted at its center for pivotal movement on a forwardly projecting support portion 84 of the trailer frame 59 which extends under a platform or bed portion 86 of the trailer frame. The bed portion 86 has been removed from drawing FIG. 3 to illustrate certain details of the present invention. As shown in FIG. 5, in particular, the cam lever 82 is preferably characterized as an elongated beam which is pivotally supported at its center on a bearing pin 88 which is journaled in a suitable bearing 90 secured to the frame portion 84. As shown in FIG. 3, the cam lever 82 includes two opposed arms 92 and 94 which are adapted to support respective cam followers 96 and 98 on forwardly projecting beam parts 100. FIG. 6 illustrates by way of example, a detail of the cam follower 98 which may comprise a deep groove ball bearing assembly suitably supported on a pin 102 which in turn is disposed on the beam part 100.

As shown in FIG. 3, the cam followers 96 and 98 are adapted to be engaged with a cam, generally designated by the numeral 104. The cam 104 is preferably characterized by spaced apart upper and lower plates 106 and 108, see FIG. 7, and a perimeter cam surface 110. A reinforcing member 112, FIG. 3, may also be interposed between the upper and lower cam plates 106 and 108, to form a generally flat built up plate-like structure.

Figure 7:
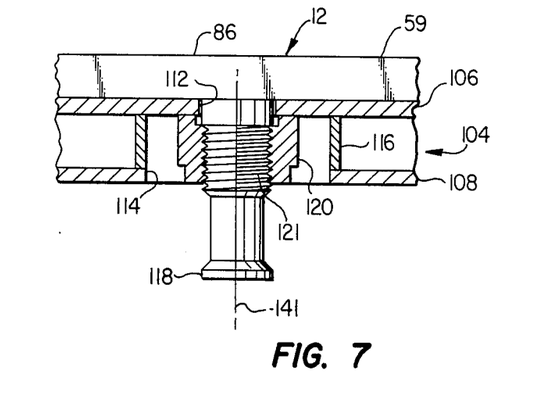
FIG. 7 is a detail section view taken along line 7—7 in FIG. 3 and showing one way to retain the cam on the trailer when it is unhitched from the tractor.

An opening 112 is formed in the upper cam plate 106, see FIGS. 3 and 7, and a co-axial but larger opening 114 is formed in the lower cam plate 108 and is partially defined by a circular reinforcing rib or web 116 extending between the cam plates 106 and 108. As shown in FIG. 7, the cam 104 is secured in assembly with the trailer frame 59 at the trailer hitch or so-called king-pin 118 by a nut 120 which is threadedly connected to the king-pin 118 to retain the cam 104 in assembly with the trailer 12. However, the cam 104 may rotate with respect to the trailer 12 about the central longitudinal axis 141 of the king-pin 118. The king-pin 118 is of conventional construction with the exception that it may be somewhat longer than conventional king-pins and has a threaded portion 121 for receiving the nut 120.

Figure 4:
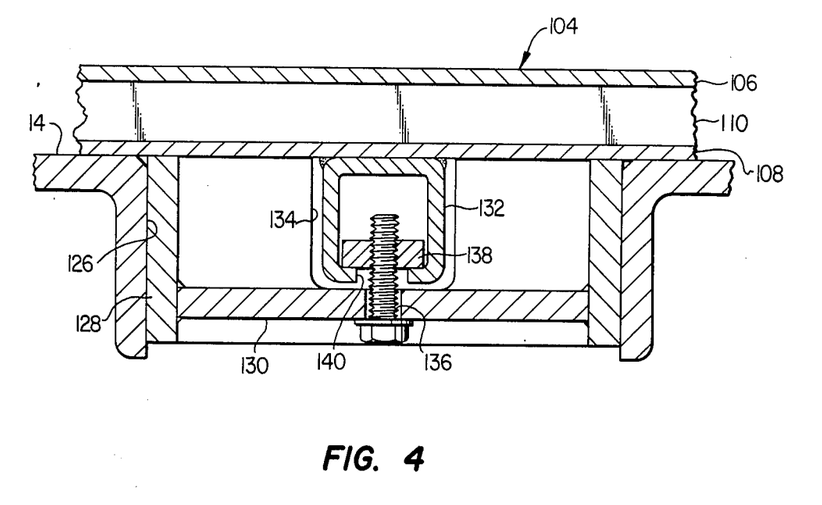
FIG. 4 is a detail section view taken along line 4—4 in FIG. 3.

Referring further to FIG. 3 and also FIG. 4, the tractor fifth wheel 14 is of conventional construction and includes a somewhat tapered or V-shaped slot 126 for receiving the king-pin 118. A conventional latching mechanism for retaining the king-pin 118 in the slot 126 has been omitted from the drawing figures in the interest of clarity and conciseness. The cam 104 is secured to the fifth wheel 14 for movement therewith by unique mechanism including a generally cylindrical key 128. The key 128 comprises a cylindrical tubular member having a transverse web portion 130. An elongated tubular strut 132 is secured to the underside of the cam plate 108, as illustrated in FIG. 4, by suitable means, such as welding, and extends through clearance recesses or grooves 134 formed in the key 128. The key 128 is slidable along the strut 132 and may be suitably clamped thereto and to the cam plate 108 by a threaded bolt 136 which is threadedly engaged with a nut 138, FIG. 4, disposed within the tubular strut 132. The strut 132 includes an elongated clearance slot 140, FIG. 4, extending therealong to permit sliding the key 128, the bolt 136 and the nut 138 along the strut 132 when the bolt has been sufficiently loosened with respect to a clamping action of the bolt against the web 130. Accordingly, the cam 104 may be secured to the fifth wheel 14 to effectively become part of the fifth wheel, upon entry of the king-pin 118 into the slot 126 and securement of the aforementioned latching mechanism, by moving the key 128 into the slot sufficiently that the key is effectively wedged tightly in the slot. The bolt 136 is then tightened to clamp the key 128 in the wedged position, such as illustrated in FIG. 3, so that the cam 104 may rotate with the fifth wheel about the axis 141.

Figures 8, 9:
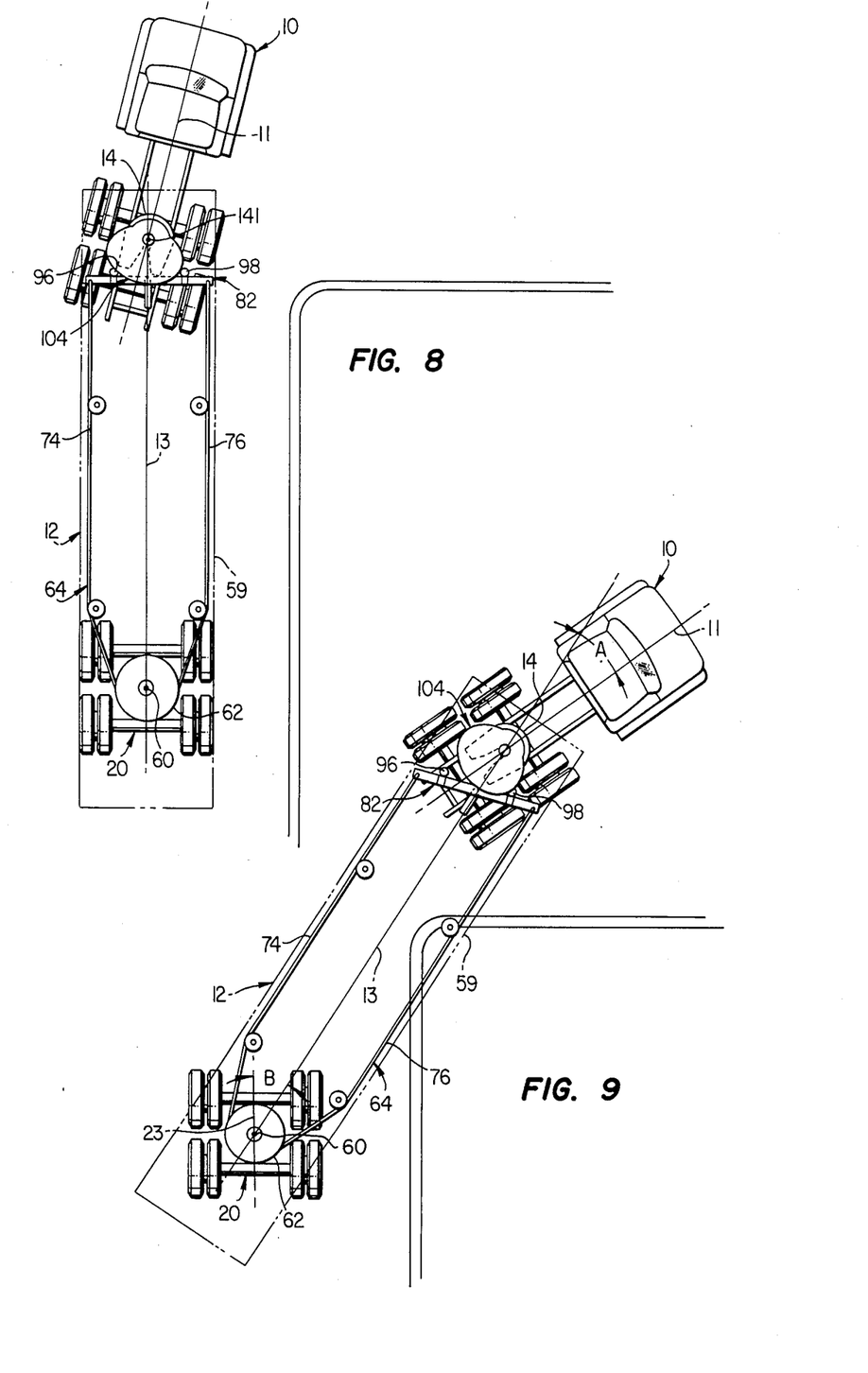
FIGS. 8, 9, 10 and 11 are top plan views showing the tractor-trailer unit in various stages of a turn.

Referring further to FIG. 3, the cam 104 is characterized such that the cam surface 110 includes a first sector 150 which is comprised of a circular arc having its radius center at the axis 141 and opposed somewhat elliptical shaped cam sectors 152 and 154. In response to turning of the fifth wheel 14 with the tractor 10, the cam 104 rotates to control the position of the cam followers 96 and 98, respectively. In particular, the cam sectors 152 and 154 are adapted to provide for a particular relationship between the angle of rotation of the fifth wheel 14 and the angle of rotation of the bogie 20 about its pivot axis 60 with respect to the longitudinal centerline 13 of the trailer 12. A generally optimum relationship is represented by the equation:

$$A = 0.9B + 0.193(B - 50 + \sqrt{(B - 50)^2}\ )$$

in which A is the angle of rotation of the fifth wheel 14 and the centerline 11 of the tractor 10, FIG. 9, with respect to the trailer centerline 13 and B is the maximum permitted angle of rotation of the bogie 20 with respect to the trailer centerline 13. Using the abovedescribed relationship, specific dimensions of the cam 104 may be derived taking into consideration the distance from the axis of rotation of the cam 104 to the axis of rotation of the lever 82, the length of the lever arms 92 and 94, the position of the idler pulleys 78 and 80 and the radius of the cam followers 96 and 98.

Referring now to FIGS. 8 and 9, the truck tractor-trailer unit is illustrated in FIG. 8 in a mode wherein a right turn by the tractor 10 has commenced and the cam 104 has rotated about the axis 141 relative to the centerline 13 of the trailer 12. In the initial stages of a turn in either direction, the cam 104 moves out of contact with the cam follower 98 but remains in contact with the cam follower 96 for a right turn as illustrated in FIG. 8. Under this condition, the lever 82 is prevented from rotating in a clockwise direction, viewing FIG. 8, but could rotate in a counterclockwise direction. However, since there is no tension in either of the cable traces 74 or 76, the pulley 62 is not rotated and the bogie 20 maintains the position illustrated relative to the trailer centerline 13. As the turn progresses to the position illustrated in FIG. 9, the cam 104 moves out of contact with the cam follower 96 and engages the cam follower 98 and the angular relationship between the angles A and B is established and maintained. In this position, the cable trace 74 is now placed in tension. In the particular position shown in FIG. 9, the angle A is substantially equal to the angle B and this angular relationship holds until the tractor 10 has ceased to turn and is in the position illustrated in FIG. 10. In the position illustrated in FIG. 10, the centerline 23 of bogie 20 still is at an angular disposition with respect to the centerline 13 of the trailer 12 and the angle A tends to decrease in such a way that the cam 104 forces the cam follower 98 to place tension in the cable trace 74 tending to turn the bogie 20 until its centerline 23 is aligned with the centerline 13 of the trailer 12. In other words, as the angle A between the centerline 13 and the centerline 11 decreases, the angle B of the centerline 23 of the bogie 20 with respect to the centerline 13 also decreases until the bogie 20 assumes the position illustrated in FIG. 11, which is the generally aligned position of the bogie with respect to the trailer frame 59. In this position, the cam followers 96 and 98 are both in contact with the cam 104, the lever 82 cannot rotate about its pivot axis and the bogie 20 is maintained in alignment by the cable traces 74 and 76.

The dimensions of the cam 104, the lever 82 and the bogie pulley 62 may be chosen so that a 45° turn of the cam 104 about the axis 141 will permit approximately 26.5° of rotation of the lever 82 about its pivot axis which in turn will permit approximately a 50° turn of the pulley 62 and bogie 20 about its axis of rotation 60. Moreover, when the cam 104 has rotated 90°, the lever 82 is permitted approximately 45° of rotation about its pivot axis and the pulley 62 is permitted a rotational displacement about its axis of approximately 85°. Further, when cam 104 turns more than 90° with respect to the position illustrated in FIG. 11, the lever 82 is restricted from any further turning effort by engagement of one or the other of cams 96 or 98 with the fourth or forward facing cam surface 155, see FIG. 3. Accordingly, the pulley 62 and the bogie 20 are restricted from turning more than 85° in either direction with respect to the centerline 13 about the axis 60.

Figures 10, 11:
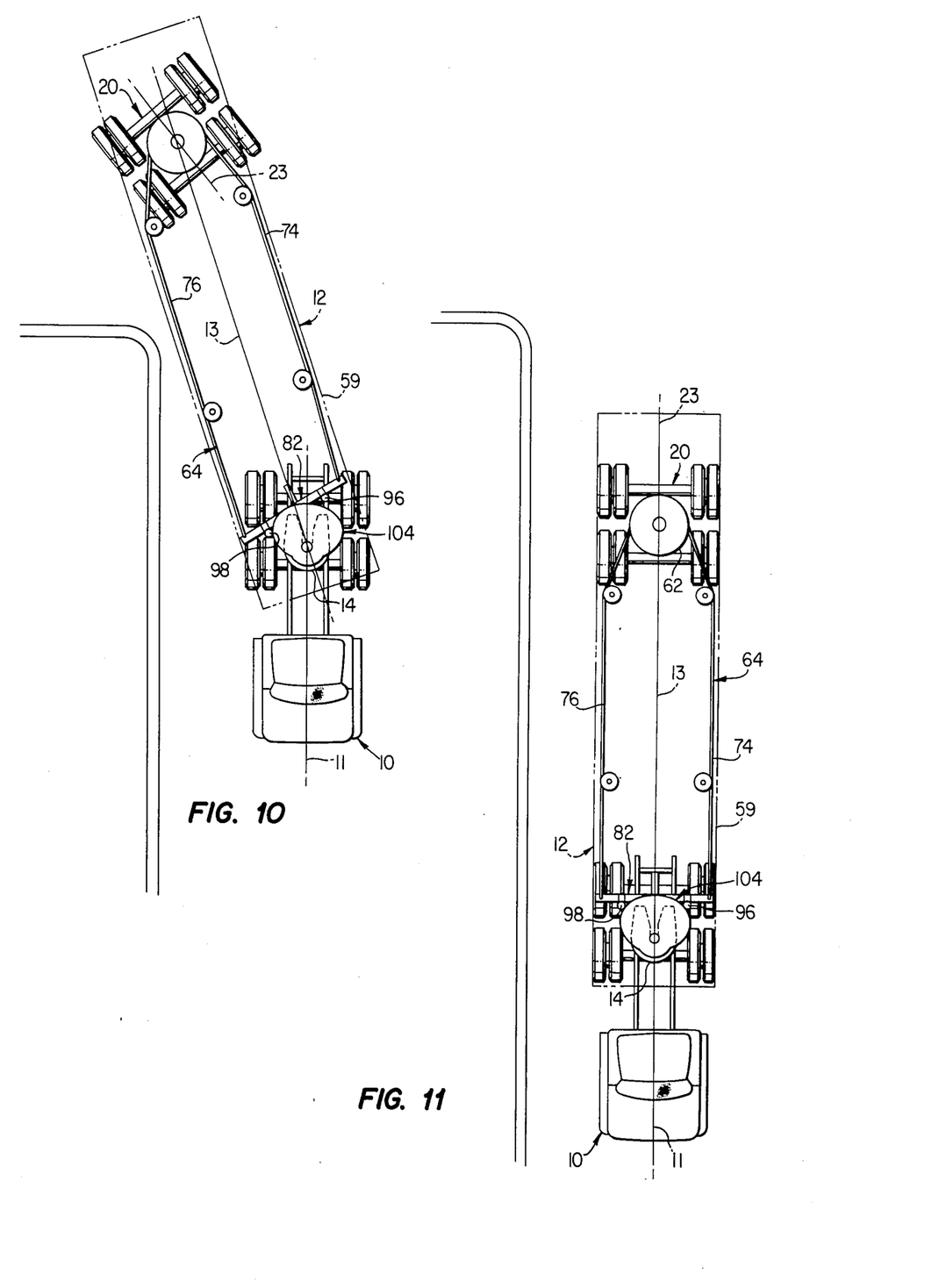
Figure 12:
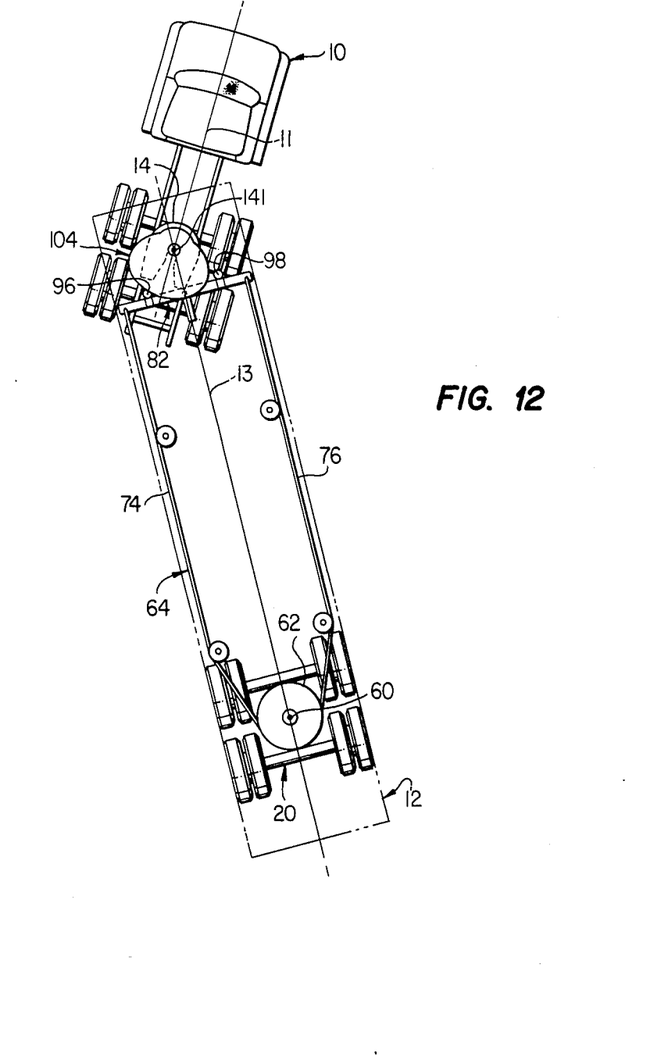
FIG. 12 is a plan view of the tractor-trailer unit while backing the trailer.

Referring now to FIG. 12, by way of example, the behavior of the trailer 12 and its bogie 20 when being moved in reverse by the tractor 10 is such that the bogie 20 maintains itself in alignment with the centerline 13, in other words, in the positional relationship shown in FIGS. 8 and 11. In the illustrated example in FIG. 12, the tractor 10 is backing to the left, viewing the drawing figure, thus tending to turn the trailer 12 in a counterclockwise direction about the bogie pivot axis 60. The friction of the wheels 19 against the roadway surface on which the trailer is sitting effects a torsional effort on the bogie 20 in a clockwise direction relative to the trailer frame 59. This reaction puts the cable trace 76 in tension tending to rotate the lever 82 in a clockwise direction about its pivot axis. However, as illustrated, the cam follower 96 is engaged with the cam 104 to prevent rotation of the lever and thereby preclude rotation of the bogie 20 relative to the trailer frame 59. Accordingly, the bogie 20 remains in a position wherein the centerline 23 remains coincident with the centerline 13 and the bogie 20 acts in a manner like a conventional fixed rear axle or bogie assembly relative to the trailer frame 59.

The abovedescribed general turning or non-turning behavior of the bogie 20 with respect to the trailer frame 59 for turns of the tractor 10 when moving forward or in reverse are, of course, identical for turns in the directions opposite to those described above.

Those skilled in the art will appreciate from the foregoing that an improved tractor-trailer combination or unit is provided by the present invention. Although the mechanism illustrated has been shown in conjunction with a tractor pulling a single semi-trailer, the system may be employed, for example, in multiple semi-trailer arrangements being towed seriatum by disconnectable fifth wheel bogie assemblies of conventional construction used in over-the-road trucking operations. Moreover, while the invention has been described in regard to a specific embodiment, it will be understood that those skilled in the art may practice the invention by making various substitutions and modifications without departing from the scope and spirit of the invention as recited in the appended claims.

What I claim is:

1. A system for controlling the turning of a semi-trailer of a tractor-trailer unit relative to the tractor wherein the tractor has steerable wheels and is connected to the trailer for turning movements relative to the trailer, said trailer including a frame and a rear wheel bogie assembly supported on said trailer for pivotable movement about a generally vertical pivot axis relative to said trailer frame, said system comprising:

cam means secured to said tractor and pivotable relative to said trailer frame about a pivot connection between said trailer and said tractor;

flexible cable means including opposed cable traces extending along said trailer frame and connected to said bogie;

cam lever means pivotally secured at pivot means on said trailer at a point forward of said bogie and connected at its opposite ends to respective ones of said cable traces; and cam follower means connected to said lever means at spaced apart points on opposite sides of said pivot means and engageable with said cam means, said cam means and said cam follower means being cooperable in such a way that in response to turning of said tractor relative to said trailer when said bogie is trailing said tractor during an initial portion of a turn of said tractor said bogie continues in a pre-turn direction of travel of said trailer, and during a further portion of a turn of said tractor said bogie pivots relative to said frame so that the path of said bogie follows substantially the same path as said tractor through said turn.

2. The system set forth in claim 1 wherein:
said cam means includes a first cam sector having a generally arcuate surface with respect to the pivot axis of the point of connection of said trailer with respect to said tractor and said cam means includes opposed cam sectors for engaging respective ones of said cam followers during a portion of a turn of said tractor relative to said trailer to restore the angular position of said bogie relative to said trailer generally in alignment with the longitudinal centerline of said trailer.

3. The system set forth in claim 2 wherein:
said lever means includes opposed lever arms secured to said cable traces; and
said bogie includes pulley means secured thereto and having said cable means trained therearound and secured thereto for pivotal movement of said bogie relative to said trailer frame in response to pivotal movement of said lever means.

4. The system set forth in claim 1 wherein:
said cam means includes means for mounting said cam means on said trailer in a predetermined position with respect to a hitch pin of said trailer.

5. The system set forth in claim 4 wherein:
said cam means includes means for securing said cam means to a fifth wheel hitch member of said tractor for rotation with said tractor about the pivot axis of said hitch pin.

6. The system set forth in claim 5 wherein:
said means for securing said cam means to said fifth wheel hitch member includes a key member adapted to be disposed in a predetermined position in a slot in said fifth wheel hitch member and secured in a fixed position relative to said fifth wheel hitch member.

7. The system set forth in claim 6 including:
an elongated strut connected to said cam means and said key member and adapted to provide for securing said key member in a preselected fixed position to said cam means for securing said cam means for rotation with said fifth wheel hitch member.

8. The system set forth in claim 2 wherein:
said cam means includes a fourth cam sector interposed between said opposed cam sectors and engageable with said cam follower means for limiting the turning movement of said bogie relative to said trailer frame.

9. The system set forth in claim 1 including:
means interconnecting said bogie and said frame and operable to prevent turning movement of said bogie relative to said frame.

10. A system for controlling the turning of a semitrailer of a tractor-trailer unit relative to the tractor wherein the tractor has steerable wheels and is connected to the trailer for turning movements relative to the trailer, said trailer including a rear wheel bogie assembly supported on said trailer for pivotable movement about a generally vertical pivot axis relative to a frame of said trailer, said system comprising:

cam means secured to said tractor and pivotable relative to said trailer frame about a pivot connection between said trailer and said tractor;

cable means including opposed traces interconnecting said bogie and cam lever means pivotally secured on said trailer at a point forward of said bogie; and cam follower means spaced apart on said lever means and engageable with said cam means, said cam means and said cam follower means being configured in such a way that in response to turning of said tractor relative to said trailer during at least a portion of a turn of said tractor, said bogie pivots relative to said frame so that the path of said bogie follows substantially the same path as said tractor through said turn in a forward direction of movement of said tractor-trailer unit and during a reverse direction of movement of said tractor-trailer unit said bogie remains aligned with said trailer frame.

11. The system set forth in claim 10 wherein:
said cam means includes a first cam sector having a curved surface with respect to the pivot axis of the point of connection of said trailer with respect to said tractor and said cam means includes opposed cam sectors for engaging respective cam followers during a portion of a turn of said tractor relative to said trailer to control the angular position of said bogie relative to said trailer.

12. The system set forth in claim 11 including:
means for mounting said cam means on said trailer in a predetermined position with respect to a hitch pin of said trailer.

13. The system set forth in claim 11 including:
means for securing said cam means to a hitch member of said tractor for rotation with said tractor about the pivot axis of said hitch pin.

14. The system set forth in claim 13 wherein:
said hitch member comprises a fifth wheel having a slot formed therein for receiving said hitch pin, and
said means for securing said cam means to said hitch member includes a key member adapted to be disposed in a predetermined position in said slot and secured in a fixed position relative to said hitch member.

15. A system for controlling the turning of a semitrailer of a tractor-trailer unit relative to the tractor wherein the tractor has steerable wheels and is connected to the trailer for turning movements relative to the trailer, said trailer including a rear wheel bogie assembly supported on said trailer for pivotable movement about a generally vertical pivot axis relative to a frame of said trailer, said system comprising:

cam means secured to said tractor and pivotable relative to said trailer frame about a pivot connection between said trailer and said tractor;

means interconnecting said bogie and said cam means and responsive to turning movement of said tractor in one direction of travel of said tractor-trailer unit to effect turning movement of said bogie relative to said frame; and means for releasably securing said cam means to a fifth wheel hitch member of said tractor for rotation with said tractor about the pivot axis of said hitch pin when said trailer is hitched to said tractor comprising a key member adapted to be disposed in a predetermined position in a slot in said fifth wheel hitch member and means for securing said key member in said predetermined position in said slot.

16. The system set forth in claim 15 wherein:
said cam means comprises a generally flat plate having a perimeter cam surface thereon, an opening formed in said plate for receiving a hitch pin of said trailer, and means engageable with said hitch pin for retaining said cam means on said trailer and rotatable relative to said hitch pin.

17. A system for controlling the turning of a semitrailer of a tractor-trailer unit relative to the tractor wherein the tractor has steerable wheels and is connected to the trailer for turning movements relative to the trailer, said trailer including a frame and a rear wheel bogie assembly supported on said trailer for pivotable movement about a generally vertical pivot axis relative to said trailer frame, said system comprising:

a generally convex lobe cam secured to said tractor and pivotable relative to said trailer frame about a pivot connection between said trailer and said tractor;

flexible cable means connected to said bogie and including opposed cable traces extending forward of said bogie toward said pivot connection;

cam lever means pivotally secured at pivot means on said trailer at a point forward of said bogie and connected at its opposite ends to repective ones of said cable traces; and cam follower means connected to said lever means at spaced apart points on opposite sides of pivot means and engageable with said cam means, respectively, in such a way that in response to turning of said tractor relative to said trailer when said bogie is trailing said tractor during an initial portion of a turn of said tractor said bogie continues in a pre-turn direction of travel of said trailer, and during a further portion of said turn of said tractor said cable traces are actuated to cause said bogie to pivot relative to said frame so that the path of said bogie follows substantially the same path as said tractor through said turn.

* * * * *